(12) United States Patent
Mellinger et al.

(10) Patent No.: US 11,318,951 B2
(45) Date of Patent: May 3, 2022

(54) VEHICLE CONSUMPTION MONITORING SYSTEM AND METHOD

(71) Applicant: General Electric Company, Schenectady, NY (US)

(72) Inventors: Aaron Craig Mellinger, Erie, PA (US); Henry Todd Young, Erie, PA (US); Jason Daniel Kuttenkuler, Erie, PA (US); Jeffrey John Wolff, Erie, PA (US); Lindsay Short, Erie, PA (US)

(73) Assignee: Transportation IP Holdings LLC, Norwalk, CT (US)

( * ) Notice: Subject to any disclaimer, the term of this patent is extended or adjusted under 35 U.S.C. 154(b) by 501 days.

(21) Appl. No.: 14/860,782

(22) Filed: Sep. 22, 2015

(65) Prior Publication Data

US 2016/0114808 A1 Apr. 28, 2016

Related U.S. Application Data

(60) Provisional application No. 62/067,238, filed on Oct. 22, 2014.

(51) Int. Cl.
*B60W 40/12* (2012.01)
*B60Q 9/00* (2006.01)
*B60W 40/00* (2006.01)

(52) U.S. Cl.
CPC .............. *B60W 40/12* (2013.01); *B60Q 9/00* (2013.01); *B60W 40/00* (2013.01);
(Continued)

(58) Field of Classification Search
CPC .......... B60W 40/12; B60W 2550/143; B60W 2530/10; B60W 2530/16; B60W 2530/18; B60Q 9/00; Y02T 10/84
See application file for complete search history.

(56) References Cited

U.S. PATENT DOCUMENTS 3,203,501 A * 8/1965 Carter ................ B60K 31/0058
180/171
8,577,530 B2 11/2013 Ruth et al.
(Continued)

FOREIGN PATENT DOCUMENTS

JP 2004-29000 1/2004
JP 2005132225 A 5/2005
(Continued)

OTHER PUBLICATIONS

Examiner's Requisition for Canadian Application No. 2,907,387, dated Dec. 11, 2019.
(Continued)

*Primary Examiner* — Christian Chace
*Assistant Examiner* — Michael F Whalen
(74) *Attorney, Agent, or Firm* — The Small Patent Law Group LLC; Joseph M. Butscher

(57) ABSTRACT

A monitoring system and method determine a consumption metric representative of one or more of an amount of fuel consumed or an amount of energy consumed by a vehicle during travel over a route. The consumption metric is independent of one or more of vehicle load or elevation change over the route. The system and method optionally can determine a route condition metric representative of a condition of a route traveled upon by a vehicle. The route condition metric is based on a comparison between an actual grade of the route at one or more locations along the route and an estimated grade of the route at the one or more locations.

11 Claims, 4 Drawing Sheets

(52) U.S. Cl.
CPC ..... *B60W 2530/10* (2013.01); *B60W 2530/16* (2013.01); *B60W 2530/18* (2013.01); *B60W 2552/20* (2020.02); *Y02T 10/84* (2013.01)

(56) References Cited

U.S. PATENT DOCUMENTS

| | | | |
|---|---|---|---|
| 8,700,283 B2 | 4/2014 | Lammers | |
| 8,857,542 B2 | 10/2014 | Hendrickson et al. | |
| 8,868,302 B2 | 10/2014 | Everett et al. | |
| 8,893,830 B2 | 11/2014 | Ruth | |
| 9,650,233 B2* | 5/2017 | Medwin | B66F 9/24 |
| 2007/0118502 A1* | 5/2007 | Aragones | G06Q 10/06 |
| 2008/0297335 A1* | 12/2008 | Yeh | B60R 16/0236 |
| | | | 340/439 |
| 2009/0177335 A1* | 7/2009 | Young | G05B 13/024 |
| | | | 701/1 |
| 2009/0265059 A1* | 10/2009 | Medwin | B66F 9/0755 |
| | | | 701/31.4 |
| 2010/0006377 A1* | 1/2010 | McCabe | B66F 9/07545 |
| | | | 187/224 |
| 2010/0256848 A1 | 10/2010 | Sasaki et al. | |
| 2011/0032093 A1* | 2/2011 | Miller | B60W 30/146 |
| | | | 340/441 |
| 2011/0112710 A1* | 5/2011 | Meyer-Ebeling | B60L 15/2045 |
| | | | 701/22 |
| 2011/0148614 A1* | 6/2011 | Wagner | B60W 40/09 |
| | | | 340/439 |
| 2012/0215379 A1* | 8/2012 | Sprock | E02F 9/2054 |
| | | | 701/2 |
| 2012/0221216 A1* | 8/2012 | Chauncey | B60W 40/09 |
| | | | 701/51 |
| 2013/0018583 A1* | 1/2013 | Miura | G01C 21/3697 |
| | | | 701/533 |
| 2013/0069803 A1* | 3/2013 | McCormick | G01C 21/34 |
| | | | 340/989 |
| 2013/0126251 A1 | 5/2013 | Ruth | |
| 2013/0151046 A1* | 6/2013 | Choi | G08G 1/096827 |
| | | | 701/22 |
| 2013/0151142 A1* | 6/2013 | Choi | B60L 15/2045 |
| | | | 701/423 |
| 2013/0164712 A1* | 6/2013 | Hunt | B60W 40/09 |
| | | | 434/65 |
| 2013/0164714 A1* | 6/2013 | Hunt | G09B 19/167 |
| | | | 434/65 |
| 2013/0261846 A1* | 10/2013 | Mcquade | G06F 17/00 |
| | | | 701/2 |
| 2013/0261874 A1* | 10/2013 | Mcquade | F02D 29/02 |
| | | | 701/29.1 |
| 2013/0261907 A1* | 10/2013 | Mcquade | F02D 41/2425 |
| | | | 701/51 |
| 2014/0277971 A1 | 9/2014 | Oshiro | |
| 2015/0046132 A1* | 2/2015 | Papajewski | B60W 50/0097 |
| | | | 703/2 |
| 2015/0314793 A1* | 11/2015 | Papajewski | B60W 50/00 |
| | | | 701/22 |
| 2015/0329102 A1* | 11/2015 | Yoshikawa | B60W 30/182 |
| | | | 701/22 |
| 2016/0025508 A1* | 1/2016 | Meyer | G01C 21/3469 |
| | | | 701/424 |
| 2016/0082905 A1* | 3/2016 | Hsu | B60R 16/0236 |
| | | | 701/123 |
| 2016/0244067 A1* | 8/2016 | Hunt | B60W 40/09 |
| 2016/0281621 A1* | 9/2016 | Nakade | F02D 41/10 |
| 2017/0177002 A1* | 6/2017 | Ogura | A01B 69/008 |
| 2018/0001788 A1* | 1/2018 | Geu | B60L 15/2009 |
| 2018/0111503 A1* | 4/2018 | Araki | B60L 11/1883 |

FOREIGN PATENT DOCUMENTS

| | | |
|---|---|---|
| JP | 2010052722 A | 3/2010 |
| JP | 2010208636 A | 9/2010 |
| WO | 2013087259 A1 | 6/2013 |

OTHER PUBLICATIONS

Brazilian Search Report ad Written Opinion published in the Official Gazette #2581 of Jun. 23, 2020 for corresponding application No. BR102015026697-9. (4 Pages).

First Office Action dated Mar. 10, 2021 for corresponding Japanese Patent Application No. 2019-215718 (9 pages).

English translated version of the First Office Action dated Mar. 10, 2021 for corresponding Japanese Patent Application No. 2019-215718 (11 pages).

Decision of Rejection dated Oct. 10, 2021 for corresponding Japanese Patent Application No. 2019-215718 (8 pages).

English translated version of the Decision of Rejection Oct. 10, 2021 for corresponding Japanese Patent Application No. 2019-215718 (7 pages).

* cited by examiner

VEHICLE CONSUMPTION MONITORING SYSTEM AND METHOD

CROSS-REFERENCE TO RELATED APPLICATIONS

This application claims priority to U.S. Provisional Application No. 62/067,238, filed 22 Oct. 2014, the entire disclosure of which is incorporated herein by reference.

FIELD

The subject matter described herein relates to vehicles that consume fuels and/or energy to propel the vehicles.

BACKGROUND

Various types of vehicles consume fuels and/or energy to power the vehicles. For example, fuel gas (e.g., diesel and non-diesel fuels), electric current, oil, coal, natural gas, wind power, solar power, or the like, may be used to power the vehicles. The vehicles may power themselves to propel the vehicles using these fuels and/or energy.

The consumption of the fuels and/or energy may not be equivalent across different vehicles and/or operators of the vehicles. For example, due to differences in the way operators control throttles and/or brakes of the vehicles, different vehicles of the same type of vehicle (e.g., different ones of the same make and/or model of a vehicle) that are operated by different drivers may consume different amounts of fuel and/or energy to propel the vehicles over the same or substantially similar routes.

Simply measuring how much fuel and/or energy is consumed by different operators controlling the vehicles may not provide insight into how the operators can control the vehicles more efficiently. Merely comparing how much fuel is consumed by one operator versus another operator may not accurately reflect if the driving habits of one operator are more or less efficient in terms of the fuel and/or energy consumed than another operator.

The amount of fuel and/or energy consumed may be based on a variety of other factors that are not readily apparent. For example, calculating a distance traveled by a vehicle per unit of fuel and/or energy (e.g., miles per gallon, kilometers per liter, or the like) may not accurately reflect how efficiently different operators control the vehicles because the amount of fuel and/or energy that is consumed can significantly increase during travel over inclined segments of a route, even for more efficient operators.

Being able to directly compare how efficiently different operators control vehicles may be useful in examining the operators to find more efficient ways to control the vehicles, in identifying which vehicles operate more efficiently than other vehicles, or the like.

BRIEF DESCRIPTION

In one embodiment, a monitoring system includes a control system configured to determine a consumption metric representative of one or more of an amount of fuel consumed or an amount of energy consumed by a vehicle during travel over a route. The consumption metric is independent of one or more of vehicle load or elevation change over the route.

In another embodiment, another monitoring system includes a control system configured to determine a route condition metric representative of a condition of a route traveled upon by a vehicle. The route condition metric is based on a comparison between an actual grade of the route at one or more locations along the route and an estimated grade of the route at the one or more locations.

In another embodiment, a method (e.g., for monitoring a vehicle) includes determining a consumption metric representative of one or more of an amount of fuel consumed or an amount of energy consumed by a vehicle during travel over a route. The consumption metric is independent of one or more of vehicle load or elevation change over the route.

In another embodiment, another method (e.g., for monitoring a route) includes determining a route condition metric representative of a condition of a route traveled upon by a vehicle. The route condition metric can be based on a comparison between an actual grade of the route at one or more locations along the route and an estimated grade of the route at the one or more locations.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

One or more embodiments of the subject matter described herein provide systems and methods that determine consumption metrics representative of how much fuel and/or energy is consumed by vehicles. The consumption metrics can represent the consumed fuel and/or energy independent of vehicle load and/or elevation change over the course of trips traveled by the vehicles. The consumption metrics may be independent of the vehicle load and/or elevation change over the trips in that the consumption metrics do not change for different vehicle loads and/or elevation changes for a vehicle traveling a trip. For example, if a vehicle is operated in the same manner (e.g., the same throttle and/or brake settings are used at the same locations) along the same route from the same origin location to the same destination location for first and second trips, but the vehicle load differs for the first trip versus the second trip, then the consumption metrics may be the same or substantially the same (e.g., within a designated range of each other, such as 1%, 3%, 5%, or the like) for the first and second trips. As another example, if the vehicle is operated in the same manner (e.g., the same throttle and/or brake settings are used at the same locations) along different routes that cause the vehicle to experience different changes in elevation between origin and destination locations for third and fourth trips, then the consumption metrics may be the same or substantially the same. Determining the consumption metrics to be independent of vehicle loads and/or elevation changes can allow for the consumption metrics for different operators of the vehicles, different vehicles, different operational conditions of the vehicles, and the like, to be more easily compared to identify which vehicles, operators, and/or operational conditions are more efficient and/or to allow operators to more easily learn how to operate the vehicles more efficiently. Optionally, one or more route metrics can be determined. The route metrics can represent conditions of the routes being traveled upon by the vehicles. The consumption metrics and/or route metrics can be displayed to operators of the vehicles and/or communicated to a location that is off-board the vehicles (e.g., a dispatch center) for review by the operator and/or others at the off-board location.

Figure 1:
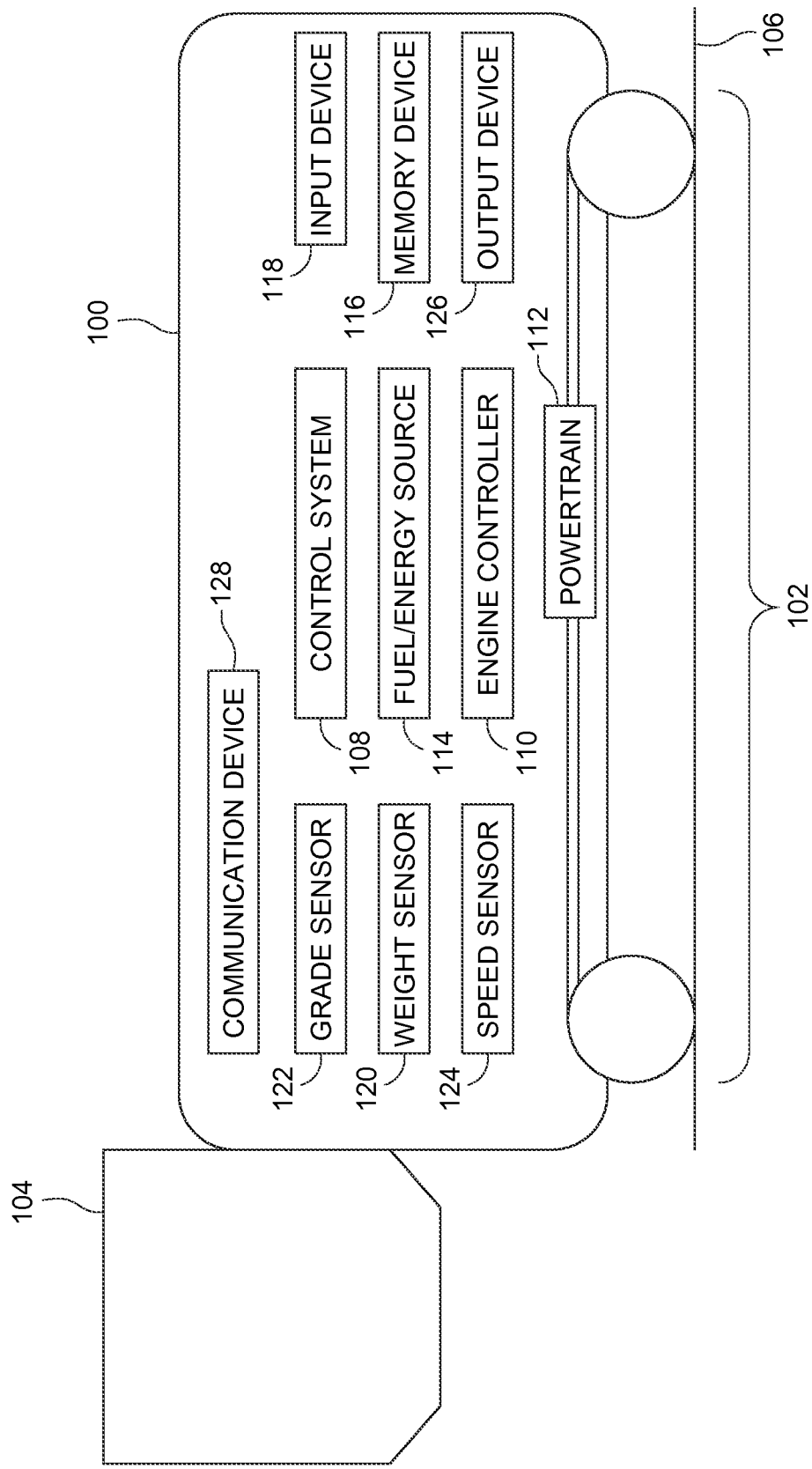
FIG. 1 is a schematic illustration of a vehicle having a vehicle consumption monitoring system according to one embodiment.

FIG. 1 is a schematic illustration of a vehicle 100 having a vehicle consumption monitoring system 102 according to one embodiment. The monitoring system determines consumption metrics and/or route metrics described herein to assist the operator of the vehicle 100 and/or others to analyze performance and/or operation of the vehicle 100. The vehicle 100 may be an off-highway vehicle, such as a mining vehicle or other vehicle that is not designed and/or not legally permitted to travel on public roadways. For example, the vehicle 100 may represent a load-haul-dump (hereinafter "LHD") type vehicle having a bucket 104 or other apparatus for carrying cargo. Alternatively, the vehicle 100 may be another type of mining vehicle. In another embodiment, the vehicle 100 is another type of vehicle, such as a rail vehicle (e.g., a locomotive), an automobile, a marine vessel, an airplane or other vehicle capable of flight, or the like. Optionally, the vehicle 100 can represent a vehicle consist, such as a group of two or more vehicles that are mechanically and/or logically coupled with each other to travel along a route 106 as a unit. Such a vehicle consist can include several vehicles connected by couplers with one or more of the vehicles 100 propelling the vehicle consist, or several vehicles that are not mechanically coupled with each other, but that communicate with each other to coordinate movements of each other such that the vehicle consist travels as a unit along the route 104. The components of the vehicle 100 and/or monitoring system 102 can be operably connected with each other by one or more wired and/or wireless connections. For example, the components described herein can be connected by wires, cables, busses, wireless network channels, or the like, for communication of data and/or other signals there between.

The monitoring system 102 is shown as being entirely disposed onboard the vehicle 100. Optionally, one or more components of the monitoring system 102 may be disposed elsewhere, such as at an off-board location (e.g., a dispatch center), onboard another vehicle in the same vehicle consist as the vehicle 100, in another vehicle that is not in the same vehicle consist as the vehicle 100, or the like.

The monitoring system 102 includes a control system 108 that represents hardware circuits or circuitry that includes and/or is connected with one or more processors (e.g., electronic logic-based devices, such as microprocessors, computers, controllers, engine control units, or the like). The processors can operate based on instructions stored on a tangible and non-transitory computer readable memory device 116, such as a computer hard drive, optical drive, flash drive, solid state drive, or the like. These instructions can direct the processors to carry out one or more operations described herein. For example, a single processor can perform all of the operations described herein, two or more processors may perform different operations, and/or two or more processors may perform one or more of the same operations.

The control system 108 can calculate consumption metrics for operators of the vehicle 100. The consumption metrics can be operator dependent in that different consumption metrics can be calculated for different operators operating the same vehicle 100 over the same trip carrying the same load, due to the different ways in which the operators control the vehicle 100. In one aspect, a per-operator consumption metric can represent or be calculated as the fuel and/or energy consumed per unit of an energy required for a trip or a segment of the trip. For example, the consumption metric may be calculated as the fuel and/or energy actually consumed by the vehicle 100 from a first location to a different, second location along the route 106, divided by an amount of energy that is calculated as being required to propel the vehicle 100 from the first location to the second location:

$$C_i = \frac{F}{E} \qquad \text{(Equation No. 1)}$$

where $C_i$ represents the consumption metric for the $i^{th}$ operator of the vehicle 100, F represents the actual amount of fuel and/or energy consumed by the vehicle 100 in moving from a first location to a second location, and E represents the amount of energy that is calculated as being required by the vehicle 100 to move from the first location to the second location.

The actual amount of fuel and/or energy consumed by the vehicle 100 (F) can be determined from data provided by an engine controller 110 of the vehicle 100. The engine controller 110 can represent an electronic control unit, such as an engine control unit (ECU), powertrain control module (PCM), or the like, that controls one or more engines of the vehicle 100 and/or monitors operation of the one or more engines. A powertrain 112 of the vehicle 100 represents the one or more engines of the vehicle 100, as well as motors, shafts, gears, axles, or the like, that translate movement (e.g., rotation) by the engines into propulsion of the vehicle 100.

The engine controller 110 also can include and/or represent a supply sensor that generates data representative of how much fuel and/or energy is supplied to the engine of the vehicle 100 from a fuel and/or energy source 114 ("Fuel/Energy Source" in FIG. 1). For example, the engine controller 110 can include a mass flow sensor that generates data representative of how much fuel is supplied to the engine, an ammeter that generates data representative of how much electric current is supplied to the motors of the vehicle and/or generated by the engine, or the like. The source 114 can represent one or more tanks holding fuel and/or batteries, capacitors, or the like, storing electric energy for powering the vehicle 100.

The control system 108 can monitor this data from the engine controller 110 to determine how much fuel and/or energy is actually consumed by the vehicle 100 (F). Optionally, the control system 108 can calculate the amount of fuel and/or energy that is actually consumed (F) based on one or more efficiency estimates and power generated by the powertrain 112. For example, the control system 108 can estimate the amount of fuel and/or energy that is actually consumed (F) based on the amounts of power generated by the powertrain 112 and a designated efficiency rate representative of how efficiently the powertrain 112 consumes fuel and/or energy at the different power outputs of the powertrain 112.

The energy required for moving the vehicle 100 (E) can be calculated by the control system 108. In one embodiment, the required energy can be estimated based on an unloaded weight of the vehicle 100, a weight of a vehicle load, grades of segments of the route 106 between the first and second locations, a moving resistance of the vehicle 100, and a distance along the route 106 from the first location to the second location. The energy (E) can be based on these factors such that, an increase in the unloaded weight, an increase in the weight of the vehicle load, inclined grades, an increase in the moving resistance, and/or an increase in the distance traveled can cause the energy (E) to increase, while a decrease in the unloaded weight, a decrease in the weight of the vehicle load, declined grades, a decrease in the moving resistance, and/or a decrease in the distance traveled can cause the energy (E) to decrease.

The unloaded weight of the vehicle 100 can be a designated weight of the vehicle 100 without cargo or materials being carried by the vehicle 100. This weight can be programmed into the memory device 116 and/or the control system 108. Optionally, this weight can be input into the control system 108 and/or memory device 116 using an input device 118 of the vehicle 100. The input device 118 can represent one or more assemblies used to receive information from an operator, such as a keypad, electronic mouse, stylus, touchscreen, microphone, pedal, throttle lever, button, or the like. The control system 108 optionally may obtain the weight from the memory device 116.

The weight of the vehicle load can be the weight of the cargo and/or materials being carried by the vehicle 100. This weight can be in addition to the unloaded weight of the vehicle 100. For example, a total weight of the vehicle 100 can include the weight of the vehicle load and the unloaded weight of the vehicle 100. The weight of the vehicle load can be input using the input device 118 and/or can be obtained from data generated by a weight sensor 120 (e.g., a scale) that represents the weight of the cargo and/or materials being carried by the vehicle 100.

The grades of segments of the route 106 between the first and second locations represent the amount of incline and/or decline of different segments of the route 106. The grades can be determined based on data generated by a grade sensor 122, such as an inclinometer, accelerometer, etc., may be input using the input device 118, and/or may be obtained from a database stored in the memory device 116. For example, the layout of the route 106 (e.g., grades, distances, curvatures, or the like) may be stored in the memory device 116.

The moving resistance of the vehicle 100 can represent forces that resist movement of the vehicle 100 along the route 106. This resistance can represent forces resisting motion of the vehicle 100 when the vehicle 100 moves along the route 106, such as rolling resistance, drag, air and/or water currents, or the like. The moving resistance can be measured or estimated by the control system 108 based on how much power is generated by the powertrain 112 and how fast the vehicle 100 moves. The moving speed of the vehicle 100 can be determined from data generated by a speed sensor 124, such as a tachometer, global positioning system receiver, cellular triangulation system, or other device. Optionally, the moving resistance can have a designated value that is stored in the memory device 116 and/or is input via the input device 118.

The distance traveled by the vehicle 100 can be determined by the control system 108, such as by monitoring how fast the vehicle 100 travels and for how long; by examining data generated by a global positioning system receiver, cellular triangulation system, or the like; and/or by receiving the distance from the memory device 116 and/or the input device 118.

The consumption metric can be calculated using one or more of these factors to represent how efficiently the operator controls the vehicle 100 from the first location to the second location. Basing the consumption metric on the fuel and/or energy consumed per energy required to travel (E) instead of the fuel and/or energy consumed per just the distance traveled can allow for the consumption metrics for different trips of the vehicle 100 or vehicles 100 to be compared. For example, different trips may have different grade profiles, which can significantly impact the rate of fuel and/or energy consumption, even though the distances traveled by the vehicle 100 or vehicles 100 in the different trips may be the same or substantially the same. Additionally, the different grade profiles can significantly impact the rate of fuel and/or energy consumption for trips having very different distances.

Figure 2:
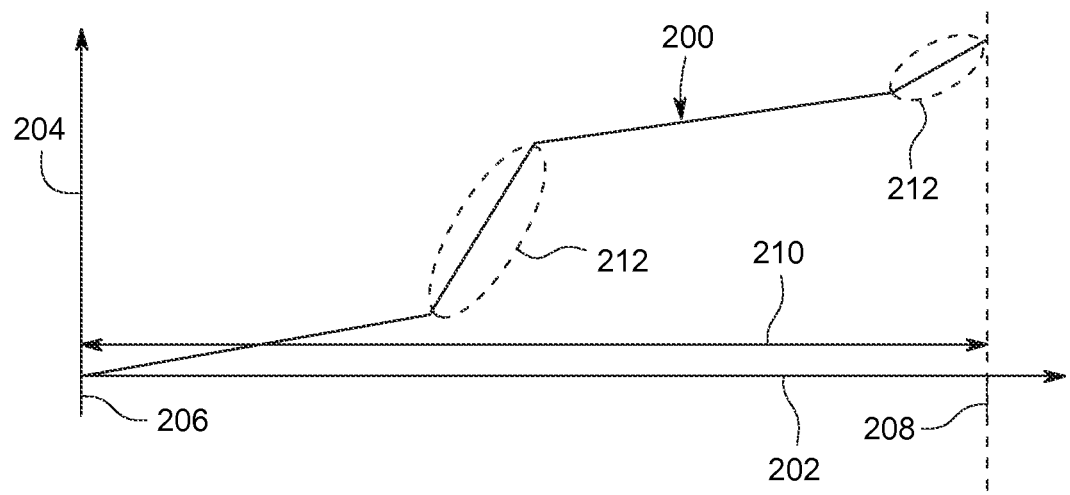
FIG. 2 illustrates a grade profile for a trip of the vehicle shown in FIG. 1 according to one example.
Figure 3:
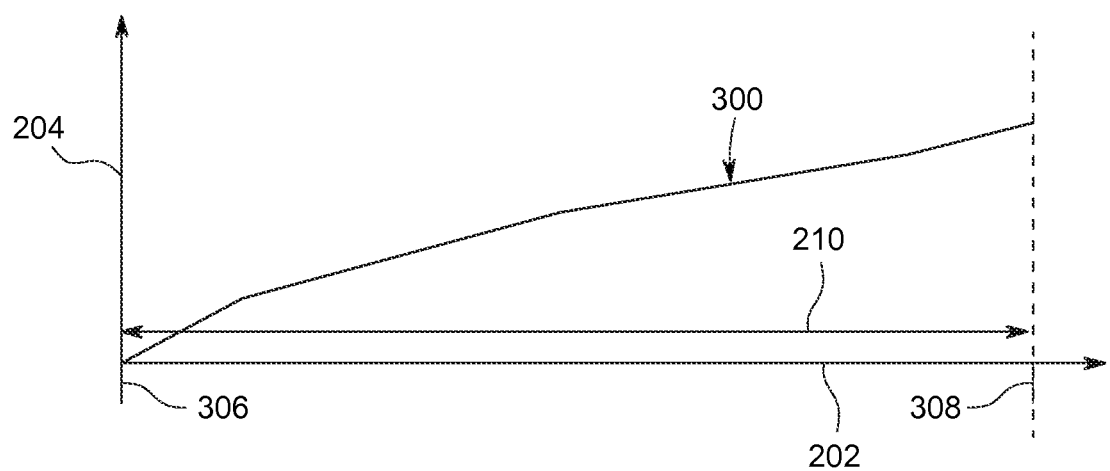
FIG. 3 illustrates a different grade profile for a trip of the vehicle shown in FIG. 1 according to one example.

FIGS. 2 and 3 illustrate different grade profiles 200, 300 for trips of the vehicle 100 according to one example. The grade profiles 200, 300 are shown alongside horizontal axes 202 representative of distance along a route 106 (shown in FIG. 1) and vertical axes 204 representative of elevation. The grade profiles 200, 300 represent the grades of the route 106 encountered by vehicles 100 traveling from origin locations 206, 306 to corresponding final locations 208, 308 of trips or hauls of the vehicles 100. Distances 210 along the route 106 from the origin locations 206, 306 to the final locations 208, 308 may be the same or substantially the same.

During travel along the route 106 according to the different grade profiles 200, 300, the vehicle 100 traveling along the grade profile 200 may consume more fuel and/or energy than the vehicle 100 traveling along the grade profile 300. For example, generating sufficient torque or tractive effort to propel the vehicle 100 up segments 212 of inclined grades in the grade profile 200 may require more fuel and/or energy to be consumed by the powertrain 112 relative to the vehicle 100 traveling along the grade profile 300. Differences in the consumption metrics for the vehicles 100 traveling along the grade profiles 200, 300 can be due to differences in the ways in which operators of the vehicles 100 control the vehicles 100. For example, a first operator may drive a first vehicle 100 over the grade profile 200 and a second operator may drive a second vehicle 100 over the grade profile 300. The first and second vehicles 100 may have different vehicle loads. The second operator may change throttle positions more frequently and/or use larger changes in throttle positions, thereby causing the second vehicle 100 to accelerate and/or decelerate along the grade profile 300 more rapidly and/or by greater amounts relative to the first operator.

As a result, the consumption metric for the second operator may be larger than the consumption metric for the first operator due to the second operator driving less efficiently than the first operator, even though the first operator controls the first vehicle 100 over larger inclines in the route 106 and/or the first vehicle 100 is carrying a heavier load. The consumption metric of the first operator may be smaller than the consumption metric of the second operator due to the larger and/or more frequent changes in throttle positions by the second operator. For example, the amount of energy that is estimated as being required for the first vehicle 100 to travel over the grade profile 200 (e.g., E) may be larger than the amount of energy that is estimated as being required for the second vehicle 100 to travel over the grade profile 300

(e.g., E) due to the grades of the segments 212 in the grade profile 200 being larger than the grades of the grade profile 300. Optionally, the unloaded weight of the first vehicle 100, the vehicle load carried by the first vehicle 100, the moving resistance of the first vehicle 100, and/or the distance over the grade profile 200 may be larger or longer than that for the second vehicle 100.

The first operator may cause the first vehicle 100 to consume more fuel and/or energy than the second operator causes the second vehicle 100 to consume during travel over the respective grade profiles 200, 300, but, because the needed energy (E) that is estimated for the first vehicle 100 is larger than the needed energy (E) estimated for the second vehicle 100, the consumption metric of the second operator may be larger than the consumption metric of the first operator. This may be due to the more inefficient manner in which the second operator controls the second vehicle 100 relative to the first operator and the first vehicle 100.

Returning to the description of the vehicle 100 and the monitoring system 102 shown in FIG. 1, the vehicle 100 and/or monitoring system 102 may include an output device 126, such as an electronic display device (e.g., computer monitor, touchscreen, etc.), a speaker, or the like. The control system 108 may communicate the consumption metric calculated for an operator of the vehicle 100 to the output device 126, and the output device 126 may present (e.g., display or otherwise communicate to the operator) the consumption metric to the operator. In one aspect, the consumption metric is calculated and/or presented to the operator following completion of a trip of the vehicle 100 (e.g., traveling from an origin location to a destination location). Optionally, the consumption metric may additionally or alternatively be calculated and/or presented to the operator at designated time intervals, such as the end of a working shift of the operator, every hour, or the like. Additionally or alternatively, the consumption metric may be calculated and/or presented as the operator is driving the vehicle 100. The output device 126 can present the consumption metric along with the actual amount of fuel and/or energy consumed by the operator.

The vehicle 100 and/or monitoring system 102 may include a communication device 128. The communication device 128 includes or represents hardware and/or software that are used to communicate with off-board locations, such as other vehicles 100, a dispatch center, or the like. The communication device 128 may include an antenna, a transceiver, and/or associated circuitry for wirelessly communicating (e.g., communicating and/or receiving) information described herein, such as consumption metrics, the actual amount of fuel and/or energy consumed by a vehicle 100, efficiency estimates, power generated by a powertrain 112, an unloaded weight of a vehicle 100, a weight of a vehicle load, grades of segments of a route, a grade profile, a moving resistance of a vehicle, a distance to be traveled or that has been traveled by a vehicle 100, or the like. Optionally, the communication device 128 can include and/or represent a location determining device, such as a global positioning system receiver, a cellular triangulation system, or the like.

In one aspect, the control system 108 may determine one or more comparison metrics to be presented to the operator via the output device 126 and/or communicated to one or more off-board locations. The comparison metrics can include an average, median, or other statistical analysis of other consumption metrics. For example, several consumption metrics calculated for an operator over several trips, several working shifts, several days, several weeks, several months, or the like, may be stored in the memory device 116 and/or in a memory device disposed off-board the vehicle 100. An average or median of these consumption metrics can be calculated as an operator-specific consumption metric. This operator-specific consumption metric can be saved to monitor the operator over time and/or presented on the output device 126 so that the operator can compare a current consumption metric with the average or median consumption metric of the operator. The operator can determine, based on a comparison of these metrics, if the operator is controlling the vehicle 100 more or less efficiently than prior trips of the operator.

As another example, the consumption metrics calculated for several different operators controlling the same vehicle 100 at different times (e.g., during different trips) may be used to calculate a vehicle-specific consumption metric. The vehicle-specific consumption metric may be an average or median of the consumption metrics calculated for different trips of the same vehicle 100, regardless of which operators are driving the vehicle 100 during the different trips. The vehicle-specific consumption metric may be monitored by the control system 108 and/or an off-board location (e.g., a dispatch center) to identify trends in the metric that may be indicative of an impending mechanical fault or failure of the vehicle 100. For example, if the vehicle-specific consumption metric is increasing over time and/or increasing over several different operators driving the vehicle 100, then the increasing metric may indicate that the vehicle 100 is consuming more and more fuel and/or energy, and therefore may have an impeding mechanical fault or failure. The control system 108 and/or off-board location may then automatically (e.g., without operator intervention) generate warning signals presented on the output device 126 and/or communicated to a repair facility to warn the operator and/or schedule inspection, repair, and/or maintenance of the vehicle 100.

As another example, the consumption metrics calculated for several vehicles 100 operating in a same location may be used to calculate a location-specific consumption metric. For example, consumption metrics may be calculated for mining vehicles operating in the same mine. As another example, consumption metrics for vehicles 100 operating during a designated time period (e.g., a day, a week, a month, a year, or the like) in a designated location or area (e.g., the same city, county, state, country, or the like). An average or median of these consumption metrics may be calculated as a location-specific consumption metric. The location-specific consumption metric may be displayed to an operator and/or compared to the consumption metric of the operator by the control system 108 to determine how efficiently the operator is controlling the vehicle 100 relative to other operators in the same location.

As another example, the consumption metrics calculated for several vehicles 100 in a fleet of the vehicles 100 may be used to calculate a fleet-wide consumption metric. The vehicles 100 that are included in a fleet may be those vehicles 100 that are operating under the direction of a manager or other single director of operations, that are moving together (e.g., at the same time), that are engaged in the same activity (e g., mining the same mine), and/or that are under the same ownership. The fleet-wide consumption metric may be displayed to an operator and/or compared to the consumption metric of the operator by the control system 108 to determine how efficiently the operator is controlling the vehicle 100 relative to other operators in the same fleet.

The control system 108 optionally may calculate different consumption metrics for different operational settings of the vehicle 100. These consumption metrics can be referred to as operational mode-specific consumption metrics. As one example, different consumption metrics may be calculated for different throttle positions, power outputs, speeds, or the like, of the vehicle 100. During time periods that the operator controls the vehicle 100 at a first throttle setting (e.g., a first pedal position, first throttle lever position, etc.), a first power output (e.g., horsepower), a first speed, or the like, the control system 108 may calculate a first consumption metric. During different time periods that the operator controls the vehicle 100 at a different, second throttle setting, a different, second power output, a different, second speed, or the like, the control system 108 may calculate a second consumption metric, and so on. As another example, different consumption metrics may be calculated for different operational modes of the vehicle 100. For example, during time periods that the operator controls the vehicle 100 to accelerate, the control system 108 may calculate a first consumption metric. During other, different time periods that the operator controls the vehicle 100 to decelerate, the control system 108 may calculate a second consumption metric. During other, different time periods that the operator controls the vehicle 100 to maintain a speed (e.g., coast, such as by not changing speed by more than a designated threshold of 1%, 3%, 5%, or the like), the control system 108 may calculate a third consumption metric. The different consumption metrics can be displayed to the operator on the output device 126, such as by displaying the operational mode-specific consumption metrics corresponding to a current operational mode of the vehicle 100 (e.g., throttle positions, accelerating, decelerating, coasting, or the like) can be displayed during the corresponding current operational mode.

Additionally or alternatively, different consumption metrics can be determined for different grades of the route 106. These consumption metrics can be referred to as grade-specific consumption metrics. For example, during travel over different segments of the route 106 having the same or similar grade (e.g., the angles of inclination or declination are within a designated range of each other, such as 1%, 3%, 5%, 10%, or another value), an average, median, or the like, of the consumption metrics may be calculated as the grade-specific consumption metric for those segments. During travel over other segments of the route 106 having the same or similar grade, an average, median, or the like, of the consumption metrics may be calculated as the grade-specific consumption metric for those segments, and so on.

Additionally or alternatively, different consumption metrics can be determined for time periods when the vehicle 100 is loaded or unloaded with cargo, and/or for different weights of the cargo. These consumption metrics can be referred to as vehicle loading-specific consumption metrics. For example, during travel when the vehicle 100 has a loaded weight within a first range of weight (e.g., less than five hundred kilograms), an average, median, or the like, of the consumption metrics may be calculated as the vehicle loading-specific consumption metric for that amount of load. During travel when the vehicle 100 has a loaded weight within a second range of weight (e.g., at least five hundred kilograms but less than one thousand kilograms), an average, median, or the like, of the consumption metrics may be calculated as the vehicle loading-specific consumption metric for that amount of load, and so on. A consumption metric also may be calculated for when the vehicle 100 is not carrying any load.

As one example, different consumption metrics may be calculated for different throttle positions of the vehicle 100. During time periods that the operator controls the vehicle 100 at a first throttle setting (e.g., a first pedal position, first throttle lever position, etc.), the control system 108 may calculate a first consumption metric, during different time periods that the operator controls the vehicle 100 at a different, second throttle setting, the control system 108 may calculate a second consumption metric, and so on. As another example, different consumption metrics may be calculated for different operational modes of the vehicle 100. For example, during time periods that the operator controls the vehicle 100 to accelerate, the control system 108 may calculate a first consumption metric. During other, different time periods that the operator controls the vehicle 100 to decelerate, the control system 108 may calculate a second consumption metric. During other, different time periods that the operator controls the vehicle 100 to maintain a speed (e.g., coast, such as by not changing speed by more than a designated threshold of 1%, 3%, 5%, or the like), the control system 108 may calculate a third consumption metric. The different consumption metrics can be displayed to the operator on the output device 126, such as by displaying the operational mode-specific consumption metrics corresponding to a current operational mode of the vehicle 100 (e.g., throttle positions, accelerating, decelerating, coasting, or the like) can be displayed during the corresponding current operational mode.

The consumption metrics may be monitored by one or more off-board locations (e.g., a dispatch center or facility) to monitor historical trends in the consumption metrics for different operators, different vehicles, and the like. Based on this data, poor performing operators, vehicles 100, or the like, can be identified and remedied by instruction, repair, or the like. For example, poor performing operators may be identified and the manner in which the operators control vehicles 100 examined in order to instruct the operators how to more efficiently operate the vehicles 100. As another example, vehicles 100 with poor consumption metrics may be scheduled for inspection, repair, and/or maintenance. As another example, fleet-wide consumption metrics may be examined to determine how to improve efficiency across the fleet. Consumption metrics also may be examined to determine future areas for improved efficiencies.

The condition of the route 106 being traveled upon by the vehicle 100 also can impact the efficiency at which the vehicle 100 consumes fuel and/or energy. For example, poor road conditions can cause increased fuel and/or energy consumption due to increased torque being needed to propel the vehicle 100 over the route 106. In addition or as an alternate to determining the consumption metrics, the control system 108 can determine a route condition metric. The route condition metric can represent the condition of the route 106, such as a quantifiable value representative of how close or far the actual condition of the route 106 is to an ideal condition of the route 106. In one embodiment, the route condition metric may be based on a comparison between an estimated grade of the route 106 and an actual grade of the route 106. For example, the route condition metric may be calculated as:

$$R = \frac{G_e}{G_m} \qquad \text{(Equation No. 2)}$$

where R represents the route condition metric for the route 106 at one or more locations, $G_e$ represents an estimated grade of the route 106 at the one or more locations, and $G_m$ represents the actual or measured grade of the route 106 at the one or more locations.

The estimated grade of the route 106 ($G_e$) may be obtained by the control system 108. The control system 108 can calculate the estimated grade based on the vehicle load, the unloaded vehicle weight, the power generated by the powertrain 112 (e.g., torque), and/or the speed of the vehicle 100. For example, the estimated grade may be larger for heavier vehicle loads, heavier unloaded vehicle weights, increased torque generated by the powertrain 112, and/or decreased speeds of the vehicle 100, and the estimated grade may be smaller for lighter vehicle loads, lighter unloaded vehicle weights, decreased torque generated by the powertrain 112, and/or increased speeds of the vehicle 100. The actual or measured grade of the route 106 ($G_m$) may be obtained from the data generated by the grade sensor 122 and/or from a database of grades recorded in the memory device 116.

In one aspect, the control system 108 may apply a filter to one or more of the route condition metric, the estimated grade of the route 106 ($G_e$), and/or the actual or measured grade of the route 106 ($G_m$) to remove the impact of noise on the calculation of the route condition metric. Poor conditions of the route 106 can cause the power generated by the powertrain 112 (e.g., torque), the speed of the vehicle 100, and/or the measured grade of the route 106 to temporarily increase or decrease during relatively short time periods, such as when wheels of the vehicle 100 slip relative to the route 106. In order to eliminate or reduce the impact of these transient effects on the estimated grade of the route 106 ($G_e$) and/or the actual or measured grade of the route 106 ($G_m$), a low pass filter may be applied to the estimated grade of the route 106 ($G_e$) and/or the actual or measured grade of the route 106 ($G_m$). Such a filter may remove changes in the estimated grade of the route 106 ($G_e$) and/or the actual or measured grade of the route 106 ($G_m$) that occur (e.g., increase and then decrease, or decrease and then increase) within a designated time period, such as within one second, three seconds, five seconds, or the like. As a result, noise in the estimated grade of the route 106 ($G_e$) and/or the actual or measured grade of the route 106 ($G_m$) is eliminated from the calculation of the route condition metric.

The route condition metric can be presented to the operator via the output device 126 and/or communicated to an off-board location via the communication device 128. The route condition metric can represent the condition of the route 106. For example, larger route condition metrics may indicate that the powertrain 112 of the vehicle 100 is using more power (and therefore fuel and/or energy) to propel the vehicle 100 than should be necessary over the actual grade of the route 106, potentially due to poorer conditions of the route 106 (relative to smaller route condition metrics). Responsive to the route condition metric exceeding a designated threshold (e.g., a value of one, 1.25, 1.5, two, or another value), a warning signal may be automatically communicated to the operator and/or an off-board location. This warning signal may cause other vehicles 100 to change operation (e.g., use lower torques by automatically restricting the range of throttle settings that the vehicles can use), to cause a dispatch center to change schedules and/or routes of the vehicles 100 to avoid the routes 106 with poorer conditions (e.g., by automatically changing schedules of the vehicles to avoid these routes), to automatically change signals that direct which routes 106 the vehicles 100 are to take to avoid the routes 106 with poorer conditions, or the like. In one aspect, the route condition metric can be used to identify when to perform inspection, maintenance, and/or repair of a route 106, such as when the route condition metric exceeds the designated threshold and/or when the route condition metric continues to increase over a designated period of time (e.g., one or more days, weeks, months, or the like, such as a time period that is longer than an adverse weather condition or season associated with adverse weather conditions, like winter or spring). Responsive to the route condition metric exceeding the designated threshold, a dispatch facility may automatically communicate an instruction to a repair vehicle to travel to the location of the route associated with the route condition metric to inspect and/or repair the vehicle.

Figure 4:
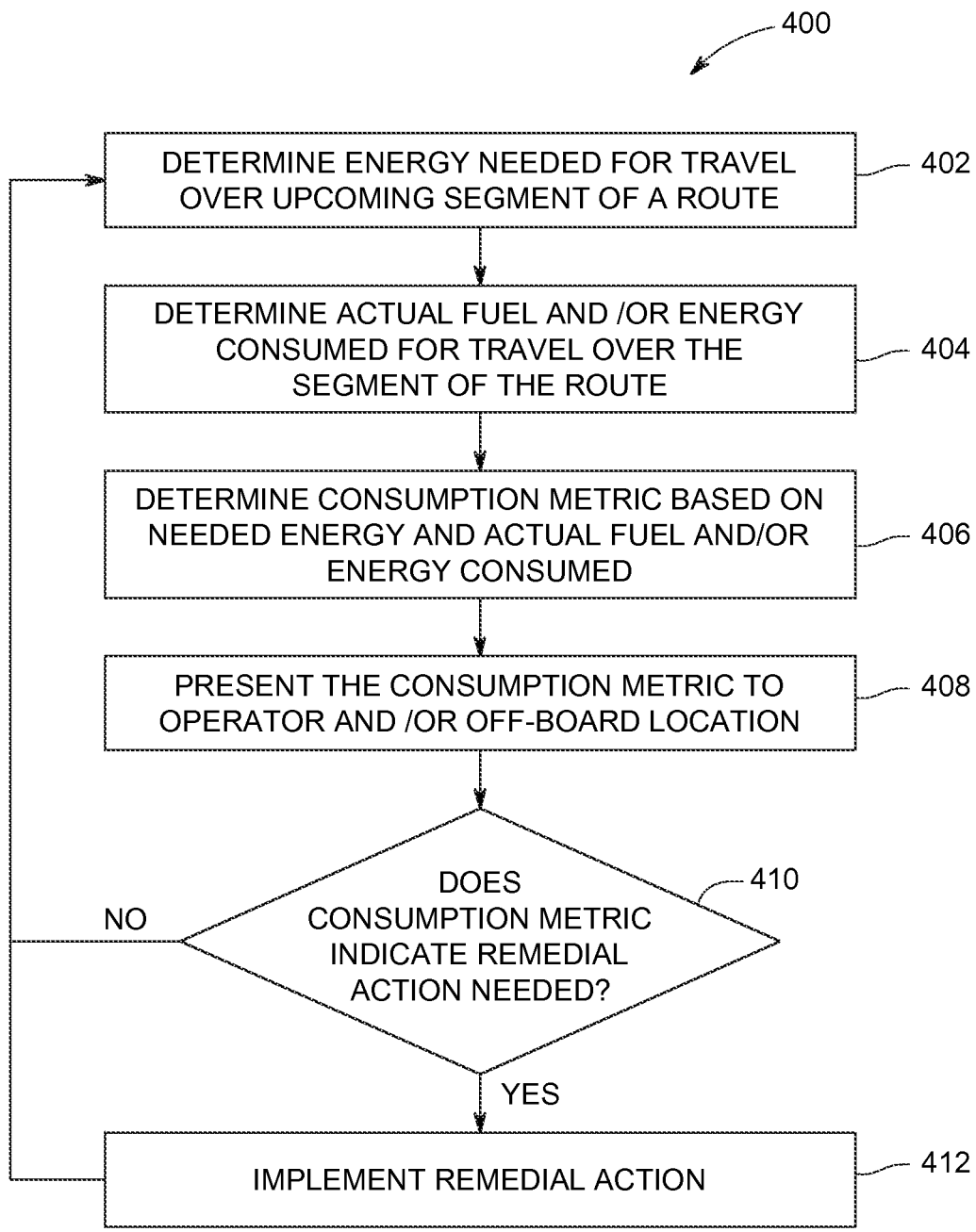
FIG. 4 illustrates a flowchart of one embodiment of a method for monitoring consumption of fuel and/or energy by a vehicle.

FIG. 4 illustrates a flowchart of one embodiment of a method 400 for monitoring consumption of fuel and/or energy by a vehicle. The method 400 may be performed by the monitoring system 122 to monitor the efficiency in which a vehicle 100 is operated. At 402, an amount of energy required for moving the vehicle 100 over an upcoming segment of a route 106 (e.g., from a first location to a second location) is determined. As described above, this energy can be calculated based on an unloaded weight of the vehicle 100, a weight of a vehicle load, grades of segments of the route 106 between the first and second locations, a moving resistance of the vehicle 100, and a distance along the route 106 from the first location to the second location.

At 404, an amount of fuel and/or energy that is actually consumed by the vehicle 100 for movement over the upcoming segment of the route 106 is determined. For example, the volume of fuel and/or amount of electric energy that is used to power the vehicle 100 during travel over the upcoming segment is measured or estimated. At 406, a consumption metric is determined based on the needed amount of energy and the amount of fuel and/or energy that is actually consumed. The consumption metric may be expressed in terms of gallons, liters, amps, watts, or the like, per Joule or other unit of energy. Optionally, the consumption metric may be determined based on one or more other consumption metrics, operational settings or modes, grades, operators, or the like, as described herein.

At 408, the consumption metric is presented to an operator of the vehicle 100 and/or to an off-board location. For example, the consumption metric may be shown on the output device 126 to the operator and/or communicated via wireless transmission and/or broadcast to a dispatch facility. At 410, a determination is made as to whether the consumption metric indicates that one or more remedial actions need to be taken. For example, consumption metrics that exceed one or more thresholds (e.g., one, 1.5, two, 2.5, or the like), may indicate that the vehicle 100 is consuming more fuel and/or energy than is needed and that action needs to be taken to reduce the amount of fuel and/or energy being wasted. If the consumption metric indicates that remedial action needs to be taken, then flow of the method 400 can proceed to 412. Otherwise, flow of the method 400 can return to 402.

At 412, one or more remedial actions may be taken. For example, the control system 108 may automatically implement restrictions on how frequently and/or how much throttle settings, speeds, and/or power outputs of the vehicle 100 can change in order to prevent the operator from accelerating at too great of a rate responsive to the consumption metric exceeding a designated threshold. As another example, the control system 108 and/or off-board location may then automatically generate warning signals presented on the output device 126 and/or communicated to a repair facility to warn the operator and/or schedule inspection, repair, and/or maintenance of the vehicle 100 responsive to the consumption metric exceeding a designated threshold. As another example, the consumption metric may indicate that travel over a certain grade causes an increase in the consumption metric. The control system 108 and/or dispatch center may prevent the vehicle 100 from traveling over that grade and/or limiting operations of the vehicle 100 to reduce the consumption metric over the grade. As another example, the consumption metric may indicate that certain cargo and/or load weights causes the vehicle 100 to have an increased consumption metric relative to other cargos and/or load weights. The remedial action may involve scheduling or otherwise causing the vehicle 100 to carry one or more cargos or load weights associated with the lower consumption metric and/or preventing the vehicle 100 from carrying the cargo and/or load weight associated with the larger consumption metric. Flow of the method 400 optionally may then return to 402.

Figure 5:
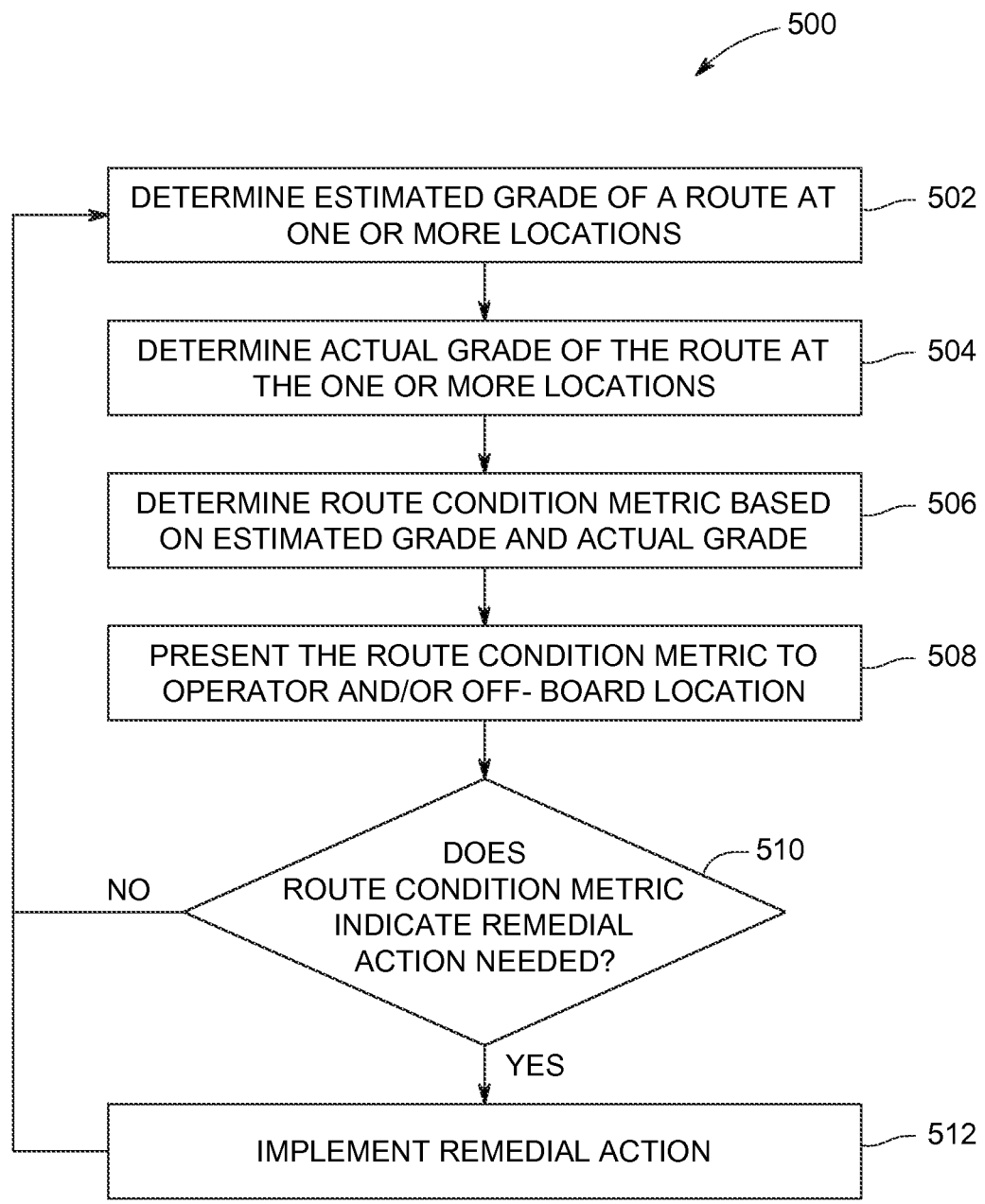
FIG. 5 illustrates a flowchart of one embodiment of a method for monitoring conditions of a route being traveled by one or more vehicles.

FIG. 5 illustrates a flowchart of one embodiment of a method 500 for monitoring conditions of a route being traveled by one or more vehicles. The method 500 may be performed by the monitoring system 122 to monitor the conditions of the route 106. At 502, an estimated grade of the route 106 at one or more locations is determined. The estimated grade of the route 106 may be calculated based on the vehicle load, the unloaded vehicle weight, the power generated by the powertrain 112 (e.g., torque), and/or the speed of the vehicle 100, as described above. At 504, the actual grade of the route 106 is determined at the one or more locations. For example, the actual grade may be measured from the data generated by the grade sensor 122 and/or from a database of grades recorded in the memory device 116. For example, the current location of the vehicle 100 can be compared with locations along the route 106 that are stored in the memory device 116 with associated grades in order to determine the actual grade of the route 106 at the one or more locations.

At 506, the route condition metric is determined based on the estimated grade and the actual grade. For example, the route condition metric can represent the amount or degree to which the estimated grade is larger than the actual grade, as described herein. In one aspect, a filter can be applied to one or more of the route condition metric, the estimated grade of the route 106 (GO, and/or the actual or measured grade of the route 106 ($G_m$) to remove the impact of noise on the calculation of the route condition metric. At 508, the route condition metric can be presented to the operator and/or communicated to an off-board location.

At 510, a determination is made as to whether the route condition metric indicates that one or more remedial actions need to be taken. For example, route condition metrics that exceed one or more thresholds (e.g., one, 1.5, two, 2.5, or the like), may indicate that the condition of the route 106 at the one or more locations is poor (e.g., slippery or otherwise adverse to travel). If the route condition metric indicates that remedial action needs to be taken, then flow of the method 500 can proceed to 512. Otherwise, flow of the method 500 can return to 502.

At 512, one or more remedial actions may be taken. For example, the control system 108 may automatically implement restrictions on how frequently and/or how much throttle settings, speeds, and/or power outputs of the vehicle 100 can change in order to prevent the operator from accelerating at too great of a rate. As another example, the control system 108 and/or off-board location may then automatically generate warning signals presented on the output device 126 and/or communicated to a repair facility to warn the operator and/or schedule inspection, repair, and/or maintenance of the route 106. As another example, the control system 108 and/or dispatch center may prevent the vehicle 100 and/or other vehicles 100 from traveling over the portion of the route 106 having the route condition metric that is indicative of a poor condition route. Flow of the method 500 optionally may then return to 502.

In one embodiment, a monitoring system includes a control system configured to determine a consumption metric representative of one or more of an amount of fuel consumed or an amount of energy consumed by a vehicle during travel over a route. The consumption metric is independent of one or more of vehicle load or elevation change over the route.

In one aspect, the control system can include one or more processors that obtain data from one or more sensors and/or a memory device in order to determine the consumption metric. The one or more sensors can include a supply sensor (e.g., a mass flow sensor, ammeter, etc.) that generates data representative of how much fuel is supplied to an engine of the vehicle and/or how much electric current is supplied to one or more motors of the vehicle, a speed sensor (e.g., a tachometer) that generates data representative of vehicle speed, a global positioning system receiver that generates data representative of how far the vehicle has traveled, etc. The memory device can include data such as weights of the vehicle and/or vehicle load, route grades, moving resistances of the vehicle, etc. The one or more processors can obtain this data from the sensors and/or memory device in order to determine the consumption metric.

In one aspect, the vehicle is a mining vehicle.

In one aspect, the control system is configured to be disposed onboard the vehicle.

In one aspect, the control system is configured to determine an amount of energy needed for travel of the vehicle over the route. The consumption metric can represent the one or more of the amount of fuel consumed or the amount of energy consumed per unit of the energy needed for the vehicle to travel over the route.

In one aspect, the control system is configured to determine the energy needed for the vehicle to travel over the route based on one or more of an unloaded weight of the vehicle, a weight of a vehicle load carried by the vehicle, one or more grades of the route, a moving resistance of the vehicle, or a distance along the route that the vehicle is to travel.

In one aspect, the unloaded weight of the vehicle is a designated weight of the vehicle without cargo or materials being carried by the vehicle.

In one aspect, the weight of the vehicle load is a weight of the cargo or materials being carried by the vehicle.

In one aspect, the grade of the route represents an amount of one or more of an incline or decline of the route.

In one aspect, the moving resistance of the vehicle represents one or more forces that resist movement of the vehicle along the route.

In one aspect, the one or more of the amount of fuel consumed or the amount of energy consumed is one or more of an actual amount of fuel that is actually consumed by the vehicle or an actual amount of electric energy that is actually consumed by the vehicle.

In one aspect, the control system is configured to communicate with an engine controller of the vehicle to determine the one or more of the amount of fuel consumed or the amount of energy consumed by the vehicle.

In one aspect, the monitoring system also includes a supply sensor configured to generate data representative of the one or more of the amount of fuel consumed or the amount of energy consumed by the vehicle from a fuel and/or energy source of the vehicle.

In one aspect, the control system is configured to calculate the one or more of the amount of fuel consumed or the amount of energy consumed by the vehicle based on one or more efficiency estimates of the vehicle and power generated by a powertrain of the vehicle.

In one aspect, the consumption metric represents how efficiently an operator controls the vehicle.

In one aspect, the control system is configured to present the consumption metric to an operator of the vehicle on an output device of the vehicle.

In one aspect, the control system is configured to present the consumption metric along with one or more of an actual amount of the fuel consumed or an actual amount of energy consumed by the vehicle.

In one aspect, the control system is configured to communicate the consumption parameter to one or more off-board locations off of the vehicle.

In one aspect, the control system is configured to determine one or more comparison metrics based on the consumption metric. The one or more consumption metrics include one or more of an operator-specific consumption metric representative of several consumption metrics associated with operation of the vehicle by the same operator, a vehicle-specific consumption metric representative of several consumption metrics associated with operation of the vehicle during multiple different trips of the vehicle and/or by multiple different operators, a location-specific consumption metric representative of several consumption metrics associated with operation of the vehicle and one or more other vehicles at a common location, a fleet-wide consumption metric representative of several consumption metrics associated with the vehicle and one or more other vehicles in the same fleet of vehicles, an operational mode-specific consumption metric representative of several consumption metrics associated with different operational modes or settings of the vehicle, a grade-specific consumption metric representative of several consumption metrics associated with different grades of the route, and/or a vehicle loading-specific consumption metric representative of several consumption metrics associated with one or more of different cargos, different weights of the cargos, and/or an absence of the cargos in the vehicle.

In one aspect, the different operational modes of the vehicle include one or more different throttle settings of the vehicle, different speeds of the vehicle, and/or different powers generated by a powertrain of the vehicle.

In one aspect, the control system is configured to generate a warning signal based on the one or more comparison metrics, the warning signal directing one or more of an inspection, repair, and/or maintenance of the vehicle.

In one aspect, the control system is configured to determine a route condition metric representative of a condition of the route traveled upon by the vehicle. The route condition metric can be based on a comparison between an actual grade of the route at one or more locations along the route and an estimated grade of the route at the one or more locations. In another embodiment, another monitoring system includes a control system configured to determine a route condition metric representative of a condition of a route traveled upon by a vehicle. The route condition metric is based on a comparison between an actual grade of the route at one or more locations along the route and an estimated grade of the route at the one or more locations. The control system is configured to determine the estimated grade of the route based on one or more of a vehicle load, an unloaded vehicle weight, power generated by a powertrain of the vehicle, or a speed of the vehicle.

In one aspect, the control system is configured to filter changes in the power generated by the powertrain from the route condition metric that are determined by removing the changes in the power that occur during less than a designated time period.

In one aspect, the control system can include one or more processors that obtain data from one or more sensors and/or a memory device in order to determine the route condition metric. The one or more sensors can include a grade sensor (e.g., an inclinometer, accelerometer, etc.) that generates data representative of grades of the route, a speed sensor (e.g., a tachometer) that generates data representative of speeds of the vehicle, a global positioning system receiver that generates data representative of a distance traveled by the vehicle, etc. The memory device can store data representative of grades of the route. The one or more processors can obtain this data from the sensors and/or memory device in order to determine the route condition metric.

In one aspect, the control system is configured to determine the estimated grade of the route based on one or more of a vehicle load, an unloaded vehicle weight, power generated by a powertrain of the vehicle, and/or a speed of the vehicle.

In one aspect, the control system is configured to determine the actual grade of the route from one or more of data generated by a grade sensor of the vehicle or from grades recorded in a memory device and associated with the one or more locations along the route.

In one aspect, the control system is configured to apply a low pass filter to one or more of the route condition metric, the estimated grade of the route, and/or the actual grade of the route.

In one aspect, the control system is configured to present the route condition metric to an operator onboard the vehicle.

In one aspect, the control system is configured to generate a warning signal based on the route condition metric. The warning signal directs one or more of one or more other vehicles to reduce power outputs during travel over the route, an off-board location to change one or more of a schedule or a route being traveled by one or more other vehicles, the off-board location to change a signals that directs where the one or more other vehicles travel, and/or an inspection, maintenance, and/or repair of the route.

In another embodiment, a method (e.g., for monitoring a vehicle) includes determining a consumption metric representative of one or more of an amount of fuel consumed or an amount of energy consumed by a vehicle during travel over a route. The consumption metric is independent of one or more of vehicle load or elevation change over the route.

In one aspect, the vehicle is a mining vehicle.

In one aspect, the method also includes determining an amount of energy needed for travel of the vehicle over the route. The consumption metric can represent the one or more of the amount of fuel consumed or the amount of energy consumed per unit of the energy needed for the vehicle to travel over the route.

In one aspect, the energy needed for the vehicle to travel over the route is calculated based on one or more of an unloaded weight of the vehicle, a weight of a vehicle load carried by the vehicle, one or more grades of the route, a moving resistance of the vehicle, and/or a distance along the route that the vehicle is to travel.

In one aspect, the unloaded weight of the vehicle is a designated weight of the vehicle without cargo or materials being carried by the vehicle.

In one aspect, the weight of the vehicle load is a weight of the cargo or materials being carried by the vehicle.

In one aspect, the grade of the route represents an amount of one or more of an incline or decline of the route.

In one aspect, the moving resistance of the vehicle represents one or more forces that resist movement of the vehicle along the route.

In one aspect, the one or more of the amount of fuel consumed or the amount of energy consumed is one or more of an actual amount of fuel that is actually consumed by the vehicle or an actual amount of electric energy that is actually consumed by the vehicle.

In one aspect, the method also includes calculating the one or more of the amount of fuel consumed or the amount of energy consumed by the vehicle based on one or more efficiency estimates of the vehicle and power generated by a powertrain of the vehicle.

In one aspect, the consumption metric represents how efficiently an operator controls the vehicle.

In one aspect, the method also can include presenting the consumption metric to an operator of the vehicle on an output device of the vehicle.

In one aspect, the method also can include presenting the consumption metric along with one or more of an actual amount of the fuel consumed or an actual amount of energy consumed by the vehicle.

In one aspect, the method also can include communicating the consumption parameter to one or more off-board locations off of the vehicle.

In one aspect, the method also can include determining one or more comparison metrics based on the consumption metric. The one or more consumption metrics can include one or more of an operator-specific consumption metric representative of several consumption metrics associated with operation of the vehicle by the same operator, a vehicle-specific consumption metric representative of several consumption metrics associated with operation of the vehicle during multiple different trips of the vehicle and/or by multiple different operators, a location-specific consumption metric representative of several consumption metrics associated with operation of the vehicle and one or more other vehicles at a common location, a fleet-wide consumption metric representative of several consumption metrics associated with the vehicle and one or more other vehicles in the same fleet of vehicles, an operational mode-specific consumption metric representative of several consumption metrics associated with different operational modes or settings of the vehicle, a grade-specific consumption metric representative of several consumption metrics associated with different grades of the route, and/or a vehicle loading-specific consumption metric representative of several consumption metrics associated with one or more of different cargos, different weights of the cargos, and/or an absence of the cargos in the vehicle.

In one aspect, the different operational modes of the vehicle include one or more different throttle settings of the vehicle, different speeds of the vehicle, and/or different powers generated by a powertrain of the vehicle.

In one aspect, the method also includes generating a warning signal based on the one or more comparison metrics. The warning signal can direct one or more of an inspection, repair, and/or maintenance of the vehicle.

In one aspect, the method also can include determining a route condition metric representative of a condition of the route traveled upon by the vehicle. The route condition metric can be based on a comparison between an actual grade of the route at one or more locations along the route and an estimated grade of the route at the one or more locations.

In another embodiment, another method (e.g., for monitoring a route) includes determining a route condition metric representative of a condition of a route traveled upon by a vehicle. The route condition metric can be based on a comparison between an actual grade of the route at one or more locations along the route and an estimated grade of the route at the one or more locations.

In one aspect, the estimated grade of the route is determined based on one or more of a vehicle load, an unloaded vehicle weight, power generated by a powertrain of the vehicle, and/or a speed of the vehicle.

In one aspect, the actual grade of the route is determined from one or more of data generated by a grade sensor of the vehicle or from grades recorded in a memory device and associated with the one or more locations along the route.

In one aspect, the method also can include applying a low pass filter to one or more of the route condition metric, the estimated grade of the route, and/or the actual grade of the route.

In one aspect, the method also can include presenting the route condition metric to an operator onboard the vehicle.

In one aspect, the method also can include generating a warning signal based on the route condition metric. The warning signal can direct one or more of other vehicles to reduce power outputs during travel over the route, an off-board location to change one or more of a schedule or a route being traveled by one or more other vehicles, the off-board location to change a signals that directs where the one or more other vehicles travel, and/or an inspection, maintenance, and/or repair of the route.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A control system, configured to:
   compare a measured energy consumption amount of a vehicle for travel from a first location to a second location along a route segment to a predetermined energy consumption amount associated with the route segment,
   monitor input from an operator of the vehicle for one or more operating parameters selected from a throttle setting, a vehicle speed, and an engine power output, and
   prevent the operator from changing a setting of the one or more operating parameters at a rate that exceeds a threshold limit rate that is based at least in part on the predetermined energy consumption amount.

2. The control system of claim 1, wherein the measured energy consumption amount is a consumption metric representative of one or more of an amount of fuel consumed or an amount of energy consumed by the vehicle during travel over the route segment.

3. The control system of claim 1, wherein the control system is configured to determine the predetermined energy consumption amount based on one or more of an unloaded weight of the vehicle, a weight of a vehicle load carried by the vehicle, a moving resistance of the vehicle, or a distance that the vehicle is to travel.

4. The control system of claim 3, wherein the unloaded weight of the vehicle is a designated weight of the vehicle without cargo or materials being carried by the vehicle.

5. The control system of claim 3, wherein the control system is configured to determine the predetermined energy consumption amount needed for the vehicle to travel over the route based on the moving resistance of the vehicle, wherein the moving resistance of the vehicle represents one or more forces that resist movement of the vehicle along the route.

6. The control system of claim 1, wherein the control system is configured to calculate the measured energy consumption amount based on power generated by a powertrain of the vehicle and one or more efficiency estimates of the vehicle.

7. The control system of claim 1, wherein the control system is configured to determine a consumption metric based on the measured energy consumption amount and the predetermined energy consumption amount, wherein the consumption metric represents how efficiently the operator controls the vehicle.

8. The control system of claim 7, wherein the control system is configured to determine one or more comparison metrics based on the consumption metric, the one or more comparison metrics including one or more of:
   an operator-specific consumption metric representative of several consumption metrics associated with operation of the vehicle by the same operator;
   a location-specific consumption metric representative of several consumption metrics associated with operation of the vehicle and one or more other vehicles at a common location;
   an operational mode-specific consumption metric representative of several consumption metrics associated with different operational modes or settings of the vehicle;
   a grade-specific consumption metric representative of several consumption metrics associated with different grades of the route; or
   a vehicle loading-specific consumption metric representative of several consumption metrics associated with one or more of different cargos, different weights of the cargos, or an absence of the cargos in the vehicle.

9. The control system of claim 8, wherein the control system is configured to determine the one or more comparison metrics as including the operational mode-specific consumption metric representative of the several consumption metrics associated with the different operational modes or settings of the vehicle, wherein the different operational modes of the vehicle include one or more different throttle settings of the vehicle, different speeds of the vehicle, or different powers generated by a powertrain of the vehicle.

10. The control system of claim 8, wherein the control system is configured to generate a warning signal based on the one or more comparison metrics, the warning signal directing one or more of an inspection, repair, or maintenance of the vehicle.

11. The control system of claim 1, wherein the control system is configured to determine a route condition metric representative of a condition of the route traveled upon by the vehicle, the route condition metric based on a comparison between an actual grade of the route at one or more locations along the route and an estimated grade of the route at the one or more locations.

* * * * *